(12) United States Patent
Ohkawa

(10) Patent No.: US 6,585,356 B1
(45) Date of Patent: Jul. 1, 2003

(54) LIGHT GUIDE PLATE, SURFACE LIGHT SOURCE DEVICE OF SIDE LIGHT TYPE AND LIQUID CRYSTAL DISPLAY

(75) Inventor: Shingo Ohkawa, Koshigaya (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 09/642,778

(22) Filed: Aug. 22, 2000

(30) Foreign Application Priority Data

Aug. 25, 1999 (JP) ............................................. 11-237744

(51) Int. Cl.$^7$ ............................................. G02F 1/1335
(52) U.S. Cl. .............................. 347/65; 349/63; 349/62
(58) Field of Search .............................. 349/65, 62, 63; 362/31, 561; 385/133, 146

(56) References Cited

U.S. PATENT DOCUMENTS

| | | | | |
|---|---|---|---|---|
| 5,390,276 A | * | 2/1995 | Tai et al. | ..................... 362/561 |
| 5,394,255 A | * | 2/1995 | Yokota et al. | ................ 349/65 |
| 5,854,872 A | * | 12/1998 | Tai | .............................. 385/133 |
| 5,999,685 A | * | 12/1999 | Goto et al. | .................. 385/146 |

FOREIGN PATENT DOCUMENTS

| | | |
|---|---|---|
| CN | 270978 | 2/1996 |
| CN | 289802 | 11/1996 |

* cited by examiner

*Primary Examiner*—Julie Ngo
(74) *Attorney, Agent, or Firm*—Staas & Halsey LLP

(57) ABSTRACT

Cylindrically curved slopes successively inner-reflect illumination light which reaches a back face or emission face of a light guide plate via an upper edge of an incidence face. The curved slopes give the light diverse propagation directions after inner-reflection. This avoids the viewer from observing a strongly irradiated edge, thereby reducing reflective appearance. Inner-reflection by the curved slopes also gives diverse propagation directions to illumination light coming via other edges, thereby reducing reflective appearance. Curved surface profile is given to valleys involved in a great number of projection rows running in a direction approximately perpendicular to the incidence face, and may be further given to the projection rows. The valleys are provided with curved surface profile within a curved-surface-profile-giving-area around the incidence face or, in addition to this, around flank faces of the light guide plate. The curved surface profile varies gradually around a boundary of the curved-surface-profile-giving-area to avoid sudden profile changing which would bring undesirable effects.

13 Claims, 9 Drawing Sheets

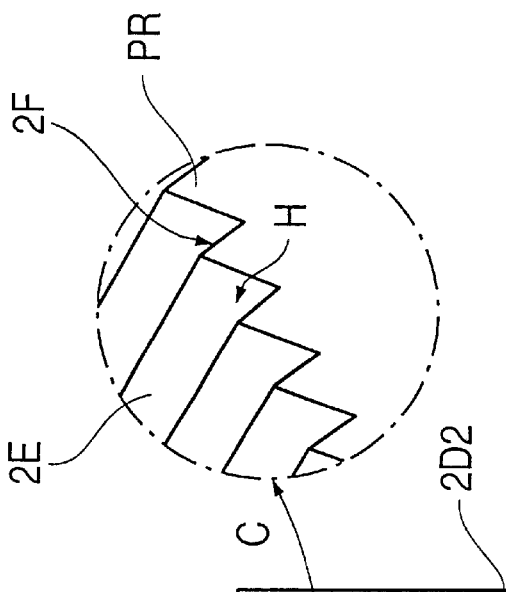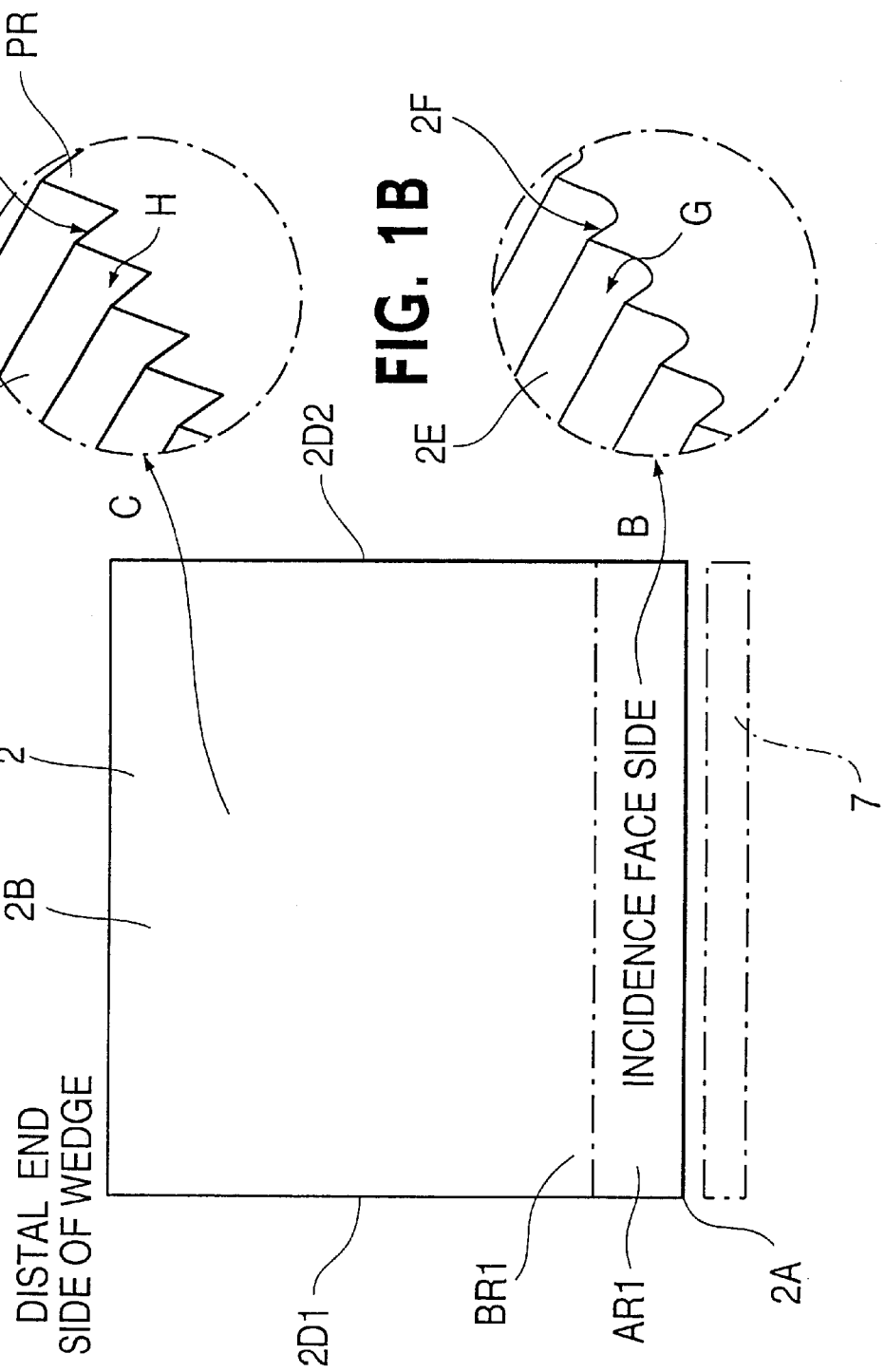

1: SURFACE LIGHT SOURCE DEVICE OF SIDE LIGHT TYPE

LIGHT GUIDE PLATE, SURFACE LIGHT SOURCE DEVICE OF SIDE LIGHT TYPE AND LIQUID CRYSTAL DISPLAY

BACKGROUND

1. Field of Invention

The present invention relates to a light guide plate, surface light source device of side light type and liquid crystal display. More specifically, the invention relates to a light guide plate having a minor face to provide a side end face through which light is inputted and having a major face through which light is outputted, and to a surface light source device of side light type and liquid crystal display which employ the light guide plate.

2. Related Art

It has been known to apply a surface light source device of side light type to a device, for example, to a liquid crystal display for backlighting its liquid crystal display panel. This arrangement is suitable for giving the device a thin whole structure.

In general, a surface light source device of side light type employs a rod-shaped light source like cold cathode tube as a primary light source which is disposed beside a light guide plate (plate-shaped light guide). The primary light source emits light illumination light which is introduced into the light guide plate through a side end face (an incidence face) provided by a minor face of the light guide plate. The introduced illumination light propagates within the light guide plate, being emitted from a major face (an emission face) of the light guide plate on the way of propagation. The emitted light is supplied to an object to be illuminated such as liquid crystal display panel via an additionally arranged prism sheet, light diffusion sheet or the like.

Guide plates employed in surface light source devices of side light type are classified into two types depending on cross section shape, one having an approximately uniform thickness, the other having thickness tending to reduce according to distance from a side end face. In general, the latter gives a higher emission efficiency as compared with the former. A known light guide plate has a major face provided with a great number of projection rows running in a direction approximately perpendicular to an incidence face.

The projection rows provide a prismatic face which is capable of modifying emission directivity of the light guide plate in a plane perpendicular to the incidence end face. Usually, the prismatic face corrects emission directivity so that emitted light is gathered around an approximately frontal direction. Such directivity correction can be achieved by an alternative such as an additional prism sheet arrangement, which leads to increased number of components or more complicated structure.

To the contrary, the fore-mentioned method, according to which "a great number of projection rows running in a direction approximately perpendicular to an incidence face are formed on a major face", is almost free from such a problem. However, this method is subject to another problem called "reflective appearance". This phenomenon, "reflective appearance", brings a local strong brightness mainly caused by emission in the vicinity of an incidence face, the emission contains light which comes via upper and lower edges of the incidence face or via right and left side edges.

Similar phenomena are apt to emerge in the vicinity of "flank faces" of a light guide plate. It is noted that "flank faces" of a light guide plate are minor faces (side end faces) adjacent to the incidence face at the right and left ends of the incidence face. In usual cases, such phenomena bring several excessively bright regions like bright lines.

Such abnormal emission deteriorates illumination quality of a surface light source device of side light type. And besides, if the surface light source device is applied to a liquid crystal display, display quality will be reduced.

OBJECT AND SUMMARY OF INVENTION

An object of the present invention is to provide a light guide plate which is improved so that the above- described problems are solved. Another object of the present invention is to provide a surface light source device of side light type which is able to suppress abnormal emission by means of the improved light guide plate. A still another object of the present invention is to provide a liquid crystal display which is able to avoid display quality from falling by employing the surface light source device of side light type.

First, the present invention is applied to a light guide plate comprising minor faces to provide an incidence face for light input and flank faces, and major faces to provide an emission face for light output and a back face.

One of said major faces of the light guide plate in accordance with the present invention is provided with a great number of projection rows running in a direction approximately perpendicular to said incidence face, thereby providing a great number of valleys. According to a feature of the present invention, each of said valleys includes, at least in the vicinity of said incidence face, a curled-surface portion including a connected pair of approximately cylindrically surfaced slopes provided by a pair of projection rows located at both sides of each of said valleys.

It is preferable that said each valley includes, further in the vicinity of said incidence face, a curled-surface portion composed of a connected pair of approximately cylindrically surfaced slopes formed in foot portions of a pair of projection rows located at both sides of said each valley.

Said valleys each include in the vicinities of said flank faces, a curled-surface portion including a connected pair of approximately cylindrically surfaced slopes provided by a pair of projection rows located at both sides of said valleys.

Next, the present invention is applied to a surface light source device comprising a primary light source and a light guide plate which has minor faces to provide an incidence face and flank faces, and major faces to provide an emission face and back face, wherein said light guide plate is arranged to be supplied with light from said primary light source through said incidence face.

One of said major faces of the light guide plate employed in a surface light source device in accordance with the present invention is provided with a great number of projection rows running in a direction approximately perpendicular to said incidence face, thereby providing a great number of valleys.

And according to a feature of the present invention, each of said valleys includes, at least in the vicinity of said incidence face, a curled-surface portion including a connected pair of approximately cylindrically surfaced slopes provided by a pair of projection rows located at both sides of said valleys.

Each of said valleys includes, in the vicinities of said flank faces, a curled-surface portion including a connected pair of approximately cylindrically surfaced slopes provided by a pair of projection rows located at both sides each of said valleys.

Said great number of valleys are preferably configurated so that roundness tends to increase according to decreasing distance from said incidence face. In a manner like this, said great number of valleys are preferably configurated so that roundness tends to increase according to decreasing distance from said flank face (a relatively nearer one of two flank faces).

Further to this, a liquid crystal display in accordance with the present invention is provided by employing the above improved surface light source device in an illumination arrangement for illuminating a liquid crystal display panel.

In light guide plates or surface light source devices improved and featured according to the present invention, curled-surface configurations included in a great number of valleys give diverse directions to light which reaches there via an upper, lower, right or left edge of an incidence face, with the result that locally concentrated emission hardly occurs. And effect like this is expected with light which reaches there via an upper or lower edge of a flank face.

If curled-surface portions are formed in the vicinity of a flank face, the curled-surface configurations included in a great number of valleys give diverse directions to light which reaches there via an upper or lower edge the flank face, with the result that locally concentrated emission is avoided more surely.

It is further noted that gradually varying roundness of the valleys enables profile of valleys to avoid from changing sharply. This prevents local brightness unevenness, which would be caused if the profile had a sharp changing.

It is needless to say that the above-described features and advantages are inherited to liquid crystal displays in accordance with the present invention and bring an improved evenness of display brightness. More detailed description of the present invention is given hereafter with referring to the accompanied drawings.

BRIEF DESCRIPTION OF DRAWINGS

FIG. 1 is a plan view of a light guide plate employed in a first embodiment;

EMBODIMENT

Figure 2A:
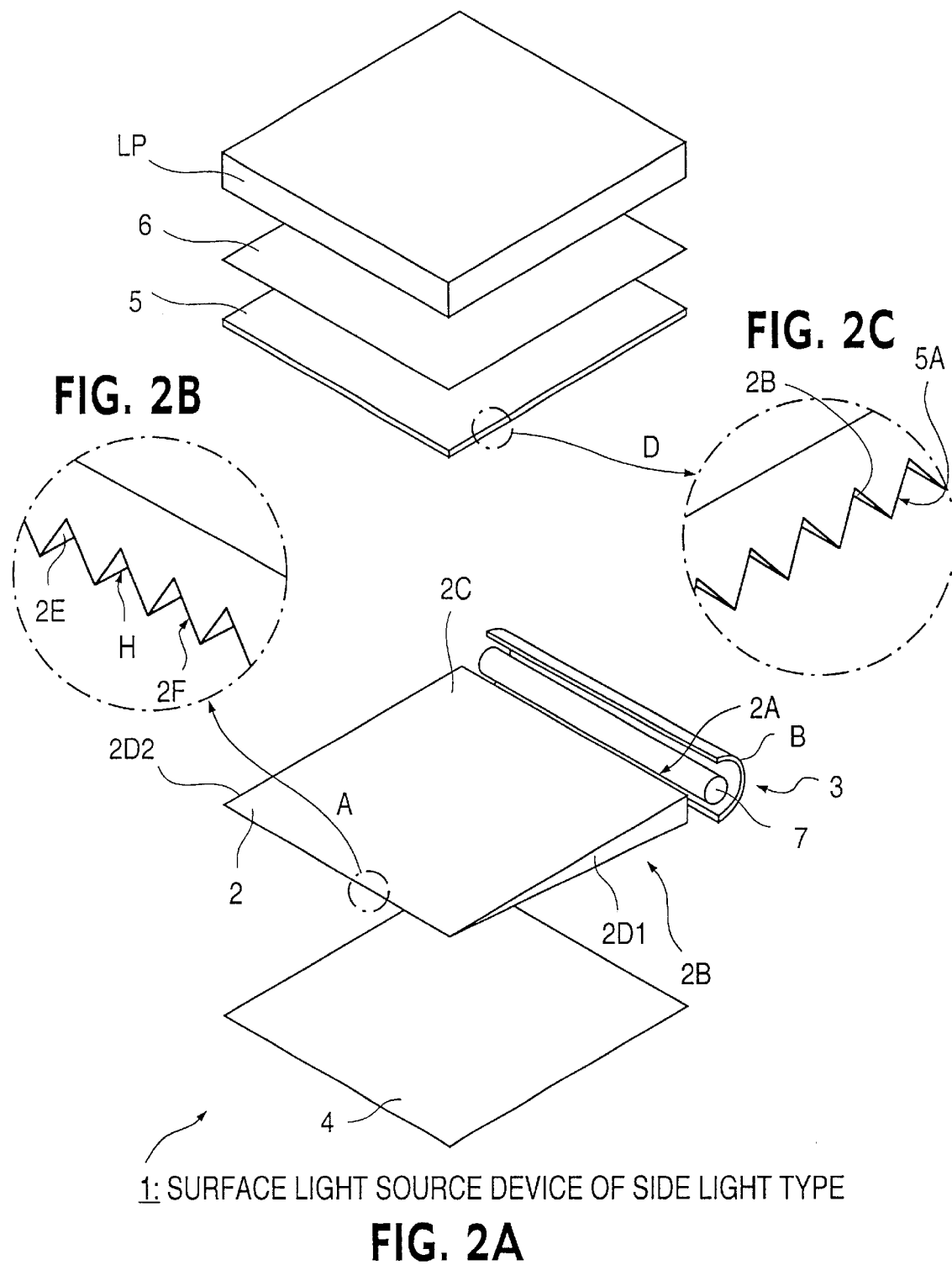
FIG. 2 is an exploded perspective view to outline an arrangement of the first embodiment.

Embodiments in accordance with the present invention are described in details with referring to the drawings. Some parts are much exaggerated in the drawings for the sake of easy understanding.

(1) First Embodiment

FIG. 1 is a plan view of a light guide plate employed in the first embodiment. FIG. 2 is an exploded perspective view to outline an arrangement of the first embodiment.

First, referring to FIG. 2, a liquid crystal display panel LP is disposed in front of a surface light source device of side light type 1 to provide a backlighting-type liquid crystal display. The liquid crystal display panel LP is supplied with illumination light outputted from the surface light source device 1. The surface light source device 1 comprises a light guide plate 2, primary light source 3, reflection sheet 4, prism sheet 5 and a protection sheet 6. The reflection sheet 4, light guide plate 2, the prism sheet 5 and the protection sheet 6 are laminatedly arranged in order while the primary light source is disposed beside and in the vicinity of an incidence face (incidence end face) provided by a minor face of the light guide plate 2. These components are mounted and held in a frame, not shown, in a well-known manner.

The primary light source 3 is composed of a cold cathode tube (fluorescent lamp) 7 and a reflector 8 surrounding the lamp 7, the reflector 8 having an opening to allow illumination light L to be incident to an incidence face 2A of the light guide plate 2. The reflector is made of, for example, a sheet material which reflects regularly or irregularly illumination light of the fluorescent lamp 7.

The guide plate 2 is an ejection-moulded transparent resin material such as polymethyl methacrylate (PMMA resin) having a wedge-like cross section. The incidence face 2A is an side end face provided by the thickest portion of the wedge shape. A great number of fine light scattering elements formed of locally roughened surface may be distributed on an emission face 2C provided by a major face to form a light scattering pattern. As known well, such light scattering pattern promotes emission from the emission face 2C depending on position, thereby flattening brightness overall. Details of light scattering pattern is not described here because related matters such as methods of forming light scattering pattern are known well.

The emission face may have roughness, instead of light scattering pattern, over all depending on position. This technique will be also able to give a overall flattened intensity of emission. However, it should be noted that bright-line-like abnormal emission is hardly avoided if this technique is applied solely.

As known well, the reflection sheet 4 returns illumination light which has leaked through a back face 2B of the light guide plate 2 into the light guide plate 2. Thus loss of light is avoided. The reflection sheet 4 may be, for instance, a white PET film capable of reflecting illumination light effectively and irregularly.

Prism sheet 5 is disposed in an orientation such that a prism cut surface is directed to the emission face 2C and projection rows run approximately in parallel with the incidence face 2A. Each of the projection rows is formed of a pair of slopes 5A, 5B connected to each other. The prism sheet 5 corrects directivity of emission from the light guide plate 2 according to a well-known function. This correction causes the emitted illumination light to have a modified principal direction roughly frontal with respect to the emission face 2C.

It is noted that the projection rows of the prism sheet 5 preferably have a formation pitch around 50 µm. And usually, vertical angle of each projection row falls within a range from 30 to 70 degrees. Although various modifications of prism cut surface configuration and other factors are employable for the prism sheet 5, details are not described here because they are known well.

The protection sheet 6 is farmed of a sheet material provided with a weak scattering power, preventing the prism sheet 5 from being damaged. Further to this, the protection sheet 6 has a function of making phenomena such as reflective appearance of edges still less conspicuous.

The back face 2B of the light guide plate 2 provides a prism cut surface. This prism cut surface is formed of a great number of fine projection rows PR running in a direction approximately perpendicular to the incidence face 2A, as illustrated partially and enlarged in FIGS. 1 and 2 (arrows A, B, C). Each projection row PR has a pair of slopes 2E, 2F which are connected to each other at a skirt portion of projection rows to provide valleys G, H. As a result, a great number of fine valleys G, H run approximately perpendicularly with respect to the incidence face 2A.

Slopes 2E, 2F make a angle, namely, a vertical angle, which falls preferably within a range from 50 to 130 degrees, in particular, about 100 degrees.

The projection rows PR correct directivity of emission regarding in a plane parallel to the incidence face 2A according to their basic function. This correction causes the emitted illumination light to be gathered around a direction frontal with respect to the emission face 2C. The projection rows PR have a formation pitch such as around 50 µm. Such a pitch (or size) ensures that the projection rows PR are almost invisible when they are observed from above the emission face 2C.

It is important that curled valleys G are formed within an area AR1 in the vicinity of the incidence face 2A (as shown with arrow B in FIG. 2) and V-shaped valleys H are formed in the other area (as shown with arrows A and C in FIGS. 1, 2). A preferable configuration of valleys H is provided with roundness which increases as distance from the area AR1 decreases, as described later.

In other words, two projection rows PR adjacent to each other include slopes 2E, 2F to provide approximately cylindrical curled slopes at the respective skirt portions within the area AR1, and the curled slopes are connected smoothly to provide a valley G. In still other words, valleys G in the area AR1 are not cut deeply while valleys H out of the area AR1 are cut deeply. Each curled surface portion gives a radius of curvature, for example, about 30 µm. A practical range of radius of curvature is from 10 to 30 µm.

Valleys H are preferably configurated so that roundness gradually increases as distance from the incidence face 2A decreases and cross section varies to arc gradually. Thus profile (shape of cross section) of valleys avoids from changing sharply at a boundary BR1 between the area AR1 and the other area. This prevents local disturbance of brightness distribution which otherwise might be caused by a sharp profile change.

A practical width of the area AR1 (i.e. distance from the incidence face 2A to the boundary BR1) is about 10 times as large as thickness of the thickest portion (at the incidence face 2A) of the light guide plate 2. The optimum value is preferably determined in designing.

Such formation of valleys G, H in the present embodiment prevents upper, lower, right and left edges of the incidence face 2A from causing reflective appearance. Besides, reflective appearance caused by upper and lower edges of flank faces 2D1, 2D2 is reduced.

Operation of the present embodiment (i.e. behavior of light) is as follows. First, except light propagating via any edge of the light guide plate 2, behaviour of light in the surface light source device 1 is generally the same as that in conventional surface light source devices of side light type. That is, the fluorescent lamp 7 emits illumination light (primary light; input light to the light guide plate 2), which is introduced into the light guide plate 2 through the incidence face 2A directly or via the reflector 8.

The introduced illumination light propagates with repeated reflections between the back face 2B and emission face 2C, approaching a distal end of the light guide plate 2. On the way, escaping from the light guide plate 2 occurs depending on the critical angle condition at inner incidence to the back face 2B or the emission face 2C. Emission from the emission face 2C provides output light of the light guide plate 2. Light emitted from the back face 2B is so-called "leaking light". A great part of leaking light is returned into the light guide plate 2 by the reflection sheet 4 to avoid loss of light.

A principal propagation direction of the output light from the emission face 2C is inclined forward as known well. This inclination modified by a well-known function of the prism sheet 5, being supplied to the liquid crystal display panel LP at the approximately right angle via the protection sheet 6. The protection sheet 6 scatters illumination light weakly to make display image mild.

It is noted that the above-described light scattering pattern promotes emission from the emission face 2C if it is formed on the emission face 2C, leading to a some reduction in directivity of emission.

Figure 3:
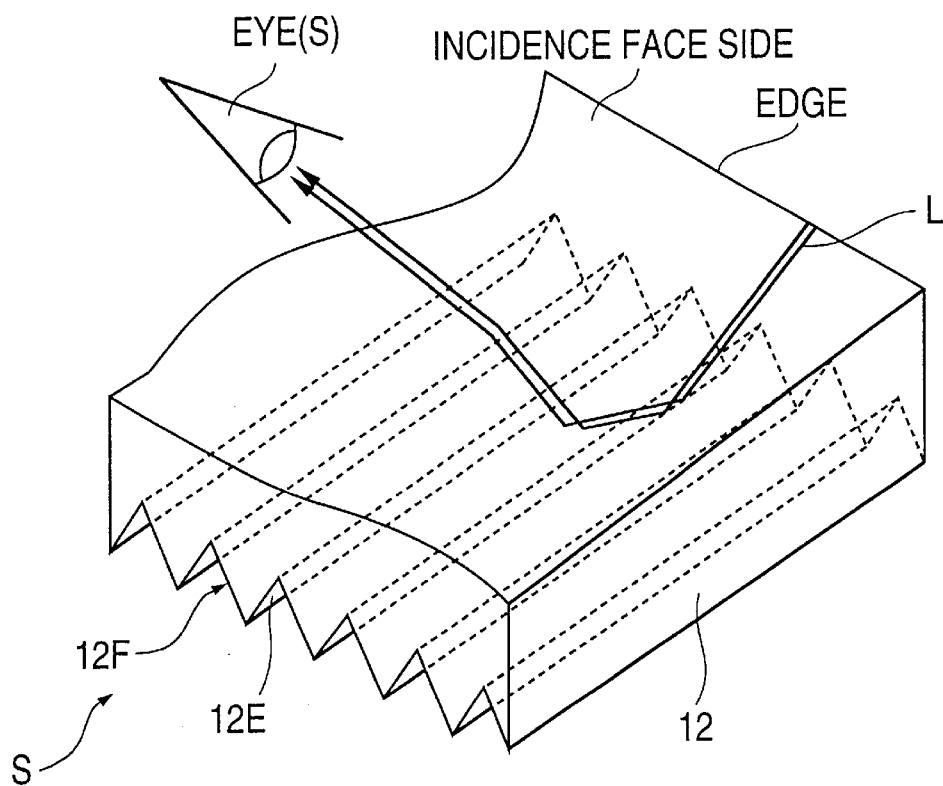
FIG. 3 is a perspective view to illustrate reflective appearance emerging in prior arts.
Figure 4:
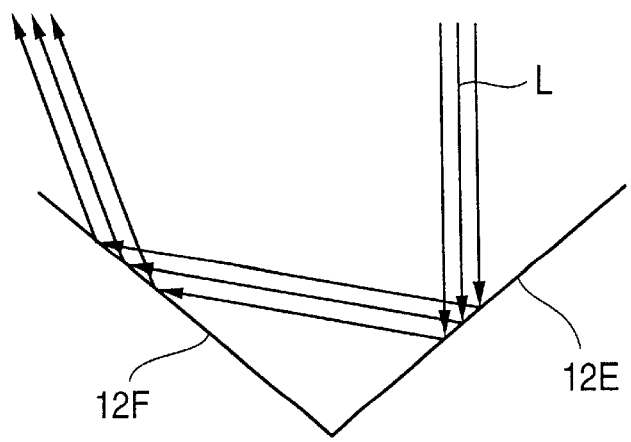
FIG. 4 is a cross section view to illustrate paths of illumination light in a plane parallel with an incidence face in connection with FIG. 3.

Next, prevention of reflective appearance in the present embodiment is explained. Referring to FIGS. 3 and 4, simply illustrated is a mechanism of reflective appearance in prior arts. FIG. 3 is a perspective view to illustrate light paths related to reflective appearance and FIG. 4 is a cross section view to illustrate paths (several paths) as viewed from a direction indicated by an arrow S.

Straight slopes 12E and 12F reflect successively illumination light L that reaches the back face of the light guide plate 12 via the upper or lower edge of the incidence face, and the reflected light is emitted from the emission face. Since the slopes 12E and 12F are straight, propagation direction after the reflections is hardly diversified. As a result, the viewer will see a strong brightness of the edges like a reflection image. This is "reflective appearance of edges". Phenomena like this in a similar mechanism occur at other edges, as described above.

Figure 5:
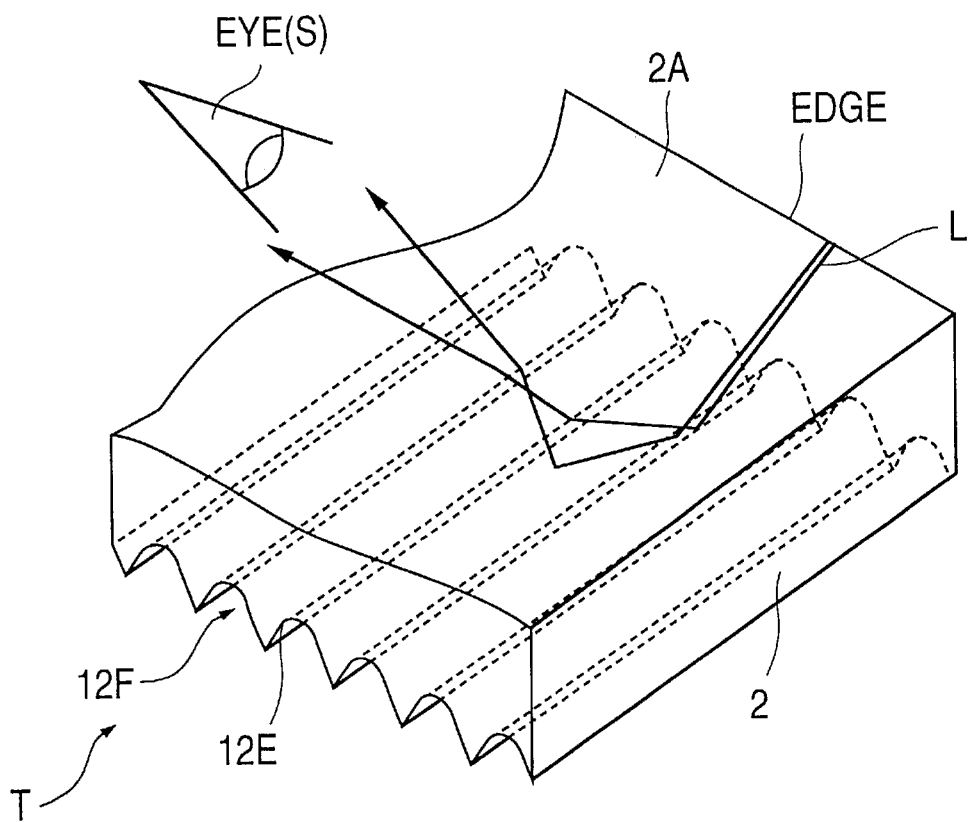
FIG. 5 is a perspective view to illustrate paths of illumination light which comes via an edge of the light guide plate shown in FIG. 1.
Figure 6:
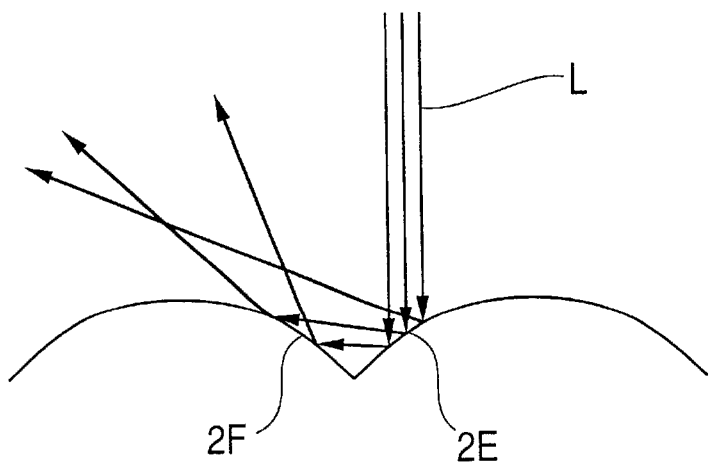
FIG. 6 is a cross section view to illustrate paths of illumination light in a plane parallel with an incidence face in connection with FIG. 5.

The present invention breaks such a mechanism to prevent reflective appearance. Referring to FIGS. 5 and 6, simply illustrated is how reflective appearance is avoided in the present embodiment. FIG. 5 is a perspective view to illustrate light paths related to avoided reflective appearance and FIG. 4 is a cross section view to illustrate paths (several paths) as viewed from a direction indicated by an arrow T.

Cylindrically curled slopes 2E and 2F reflect successively illumination light L that reaches the back face of the light guide plate 2 via the upper or lower edge of the incidence face, and the reflected light is emitted from the emission face.

It is greatly important that the slopes 2E, 2F are curled and therefore give diversified propagation directions to the reflected light. As a result, the viewer can not see a strong brightness of the edges. This is "prevention of reflective appearance of edges". Diversified propagation directions are also given, in a similar manner after reflection by a curled inner surface, to illumination light coming via other edges.

Accordingly, reflection appearance due to other edges is reduced in a similar way.

Needless to say, reflective appearance of edges is apt to occur, in general, around the edges. In particular, reflective appearance tends to emerge strongly in the vicinity of the incidence face because of s short distance from a light source. In the present embodiment, the projection rows within the area AR1 on the back face involve curled valleys to avoid such strong reflective appearance.

It is noted that curled valleys may be formed for the back face 2B overall. Such formation, however, will deteriorate a basic function (i.e. correction of directivity) of the projection rows. Therefore, curled valleys are formed preferably within a range predetermined in designing.

Further to this, transition from the area AR1, within which curled valleys G are formed (see FIG. 2), to the area AR2, within which V-shaped valleys H are formed (see FIG. 2), is preferably smooth and gradual because degree of reflective appearance increases gradually according to decrease in distance from an edge. That is, it is preferable that bottoms of valleys H out of the area AR1 have roundness growing according to decrease in distance from the boundary BR1 and a smooth transition to valleys G at the boundary BR1 is realized. Such a gentle profile changing is desirable because it prevents brightness distribution from being subject to a fine disturbance.

Figure 7:
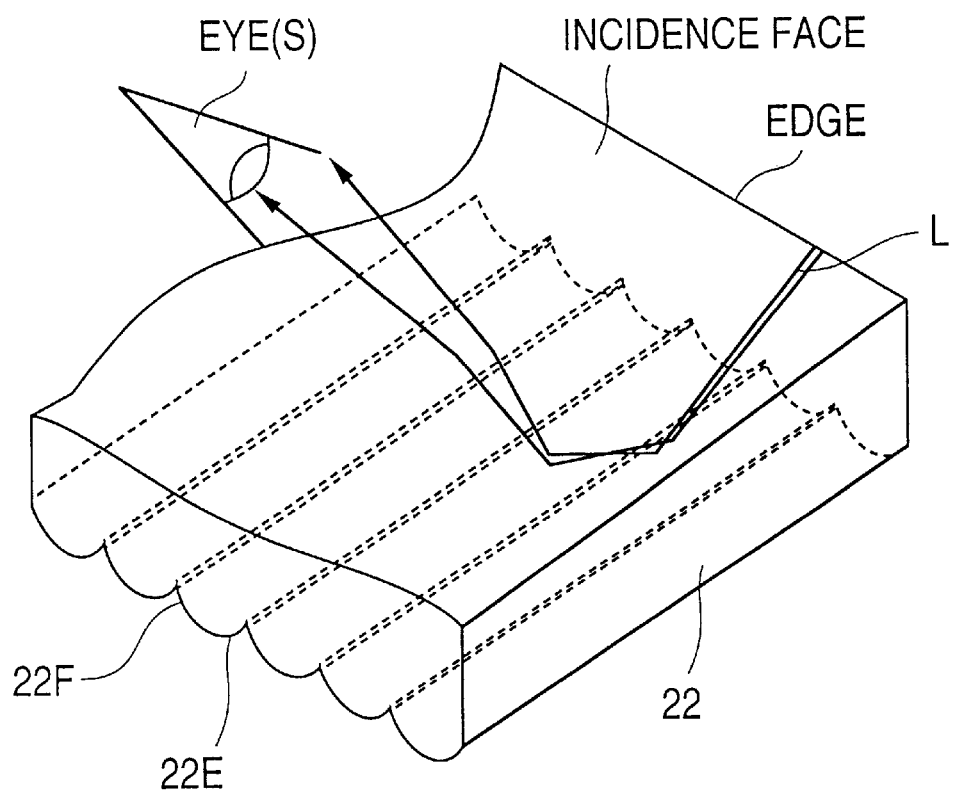
FIG. 7 is a perspective view to illustrate a reference in which projection rows have top portions formed of curved surface.
Figure 8:
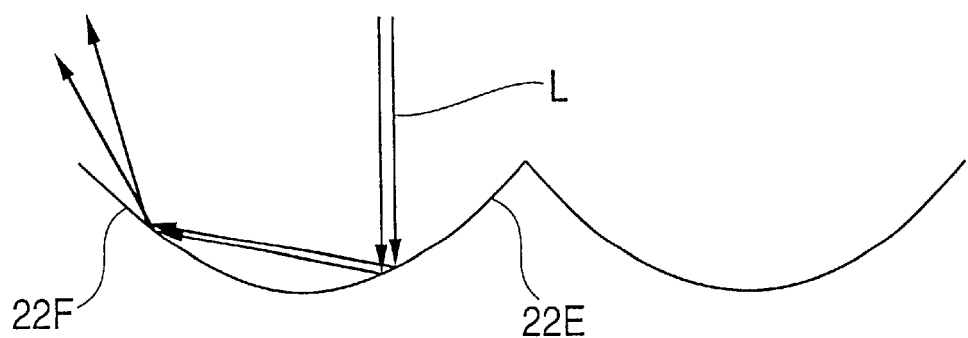
FIG. 8 is a cross section view to illustrate paths of illumination light in a plane parallel with an incidence face in connection with FIG. 7.

If a guide plate 22 having projection rows around tops (ridges) of which cylindrical surface is formed instead of curled valleys, as shown in FIGS. 7 and 8, emission directions of illumination light that comes via the upper and lower edges of an incidence face 2A can be diversified, too. As a result, abnormal emission is reduced.

However, according to experiments, this construction provides an insufficient reductions of abnormal emission due to reflective appearance of the right and left edges of the incidence face 2A (i.e. edges bridging the emission 2C to the back face 2B of the light guide plate 2) or edges of flank faces. After all, this construction failed to give a satisfactory image display quality on application to liquid crystal displays.

Consequently, curling of valleys is not equivalent with curling of tops of projection rows, the former being superior to the latter.

(2) Second Embodiment

Figure 9:
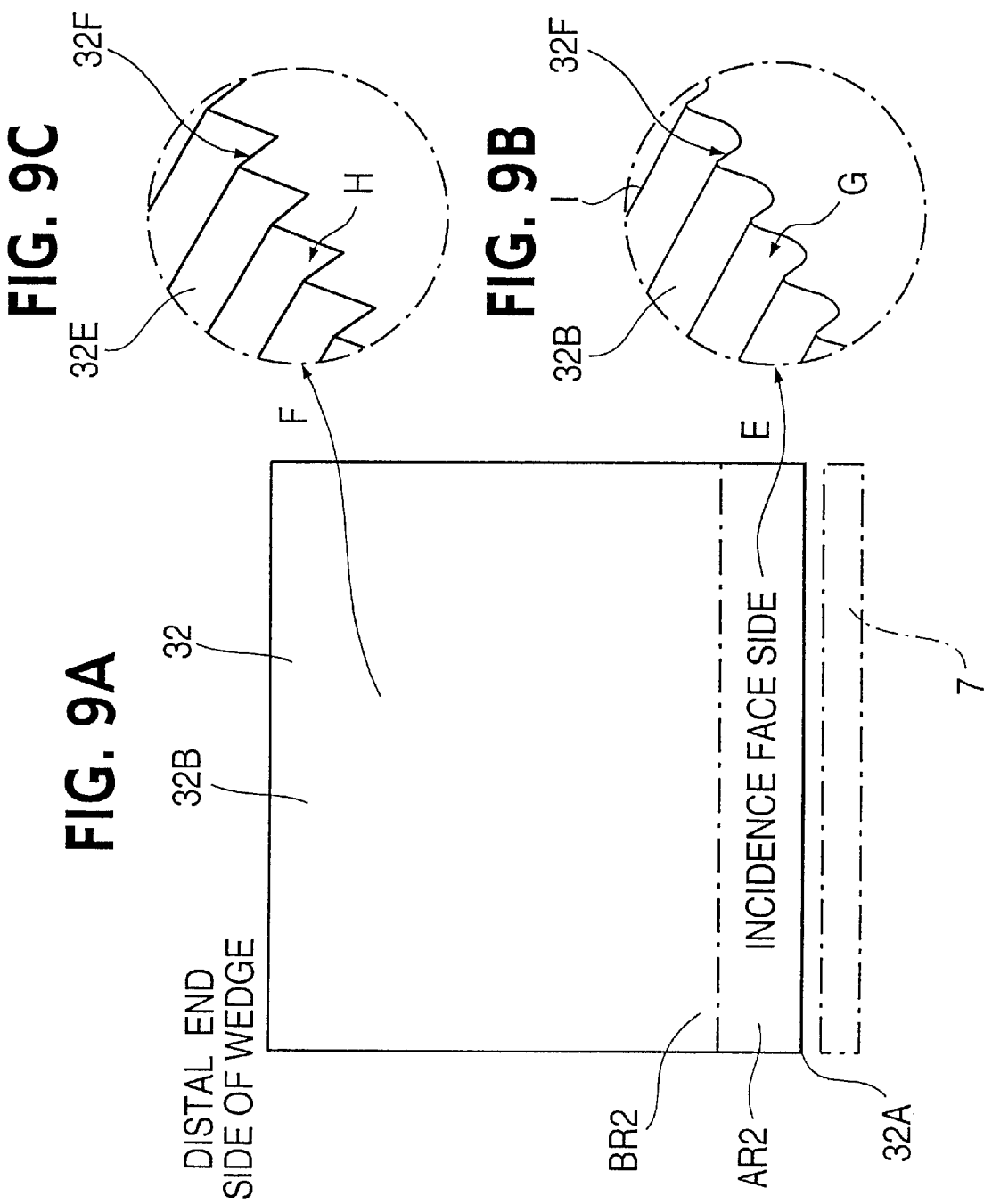
FIG. 9 is a plan view of a light guide plate employed in a second embodiment.

The present embodiment employs a light guide plate 32 as shown in FIG. 9 instead of the light guide plate 2 as shown in FIG. 1 or 2. Except this, the present embodiment has the same structured as that of the first embodiment. Accordingly, repeating of common description such as that of the whole arrangement is omitted, and description is focused on structure and operation of the light guide plate 32.

The light guide plate 32 may be formed of an injection-molded transparent resin as the light guide plate 2. One of major faces 32B (back face and emission face) provides a prism cut surface.

As partially enlarged in FIG. 9 (arrows E, F), a great number of fine projection rows running in a direction approximately perpendicular to an incidence face 32A have pairs of slopes 32E, 32F which are connected to each other at skirt portions of the projection rows to provide valleys G, H. This gives a great number of fine valleys G, H running in a direction approximately perpendicular to an incidence face 32A.

Formation pitch of the projection rows is, for instance, about 50 $\mu$m. Such a pitch (size) hardly causes the projection rows PR to be visible as viewed from above the emission face. Curled valleys G are formed within an area AR2 while V-shaped valleys H are formed in the other area as in the first embodiment. Further to this, according to a feature of the present embodiment, the valleys G are profiled so that projection rows corresponding to the valleys G have top portions I also provided with approximately cylindrical surfaces, respectively. This gives the present embodiment a difference from the first embodiment.

According to increase in distance from the area AR2, radius of curvature of curled surface connecting a pair of slopes 32E, 32F to each other is reduced gradually, coming to roughly infinite (i.e. straight slopes) around a distal end. That is, the valleys H increase their roundness according to decrease in distance from the area AR2. This prevents characteristics of the light guide plate from changing sharply around a boundary BR2, thereby avoiding local disturbance of brightness distribution.

Besides, a function of diversifying light paths after inner reflections as fore-mentioned is enforced because curled are not only the valleys G but also top portions I of the projection rows. As a result, an enforced effect of preventing reflective appearance is expected.

(3) Other Embodiments (Modifications)

None of the above embodiments aim to be limitative for the scope of the present invention. For instance, the following modifications are allowed.

(a) In the above embodiments, curled configurations (for only valleys or both valleys and top portions of projection rows) are given to projection rows in certain areas in the vicinity of incidence faces. This, however, puts no limitation on the present invention. In addition to the above certain area near to the incidence faces, certain areas AR3, AR4 around side faces, as illustrated in FIG. 10 or 11, may be provided with projection rows to which curled configurations (for only valleys or both valleys and top portions) are given as required.

Figure 10:
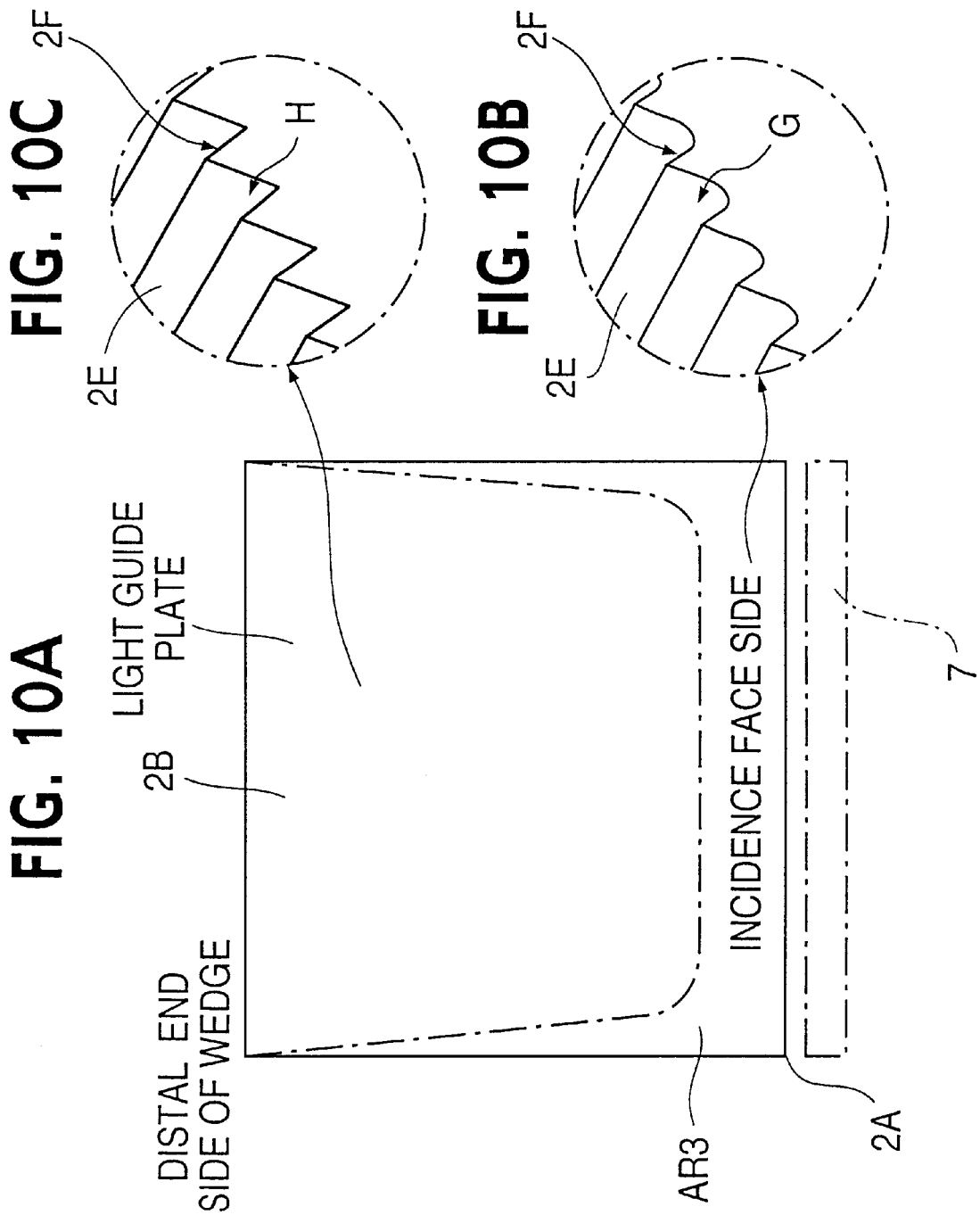
FIG. 10 is a plan view to illustrate a modification of the light guide plate shown in FIG. 1.

In the case of FIG. 10, after the first embodiment, valleys (slopes 2E, 2F) G formed among projection rows within the area AR3 are provided with curled profiles. Considering that reflective appearance tends to emerge decreasingly as distance from the incidence face increases, width of the area AR3 decreases accordingly.

Figure 11:
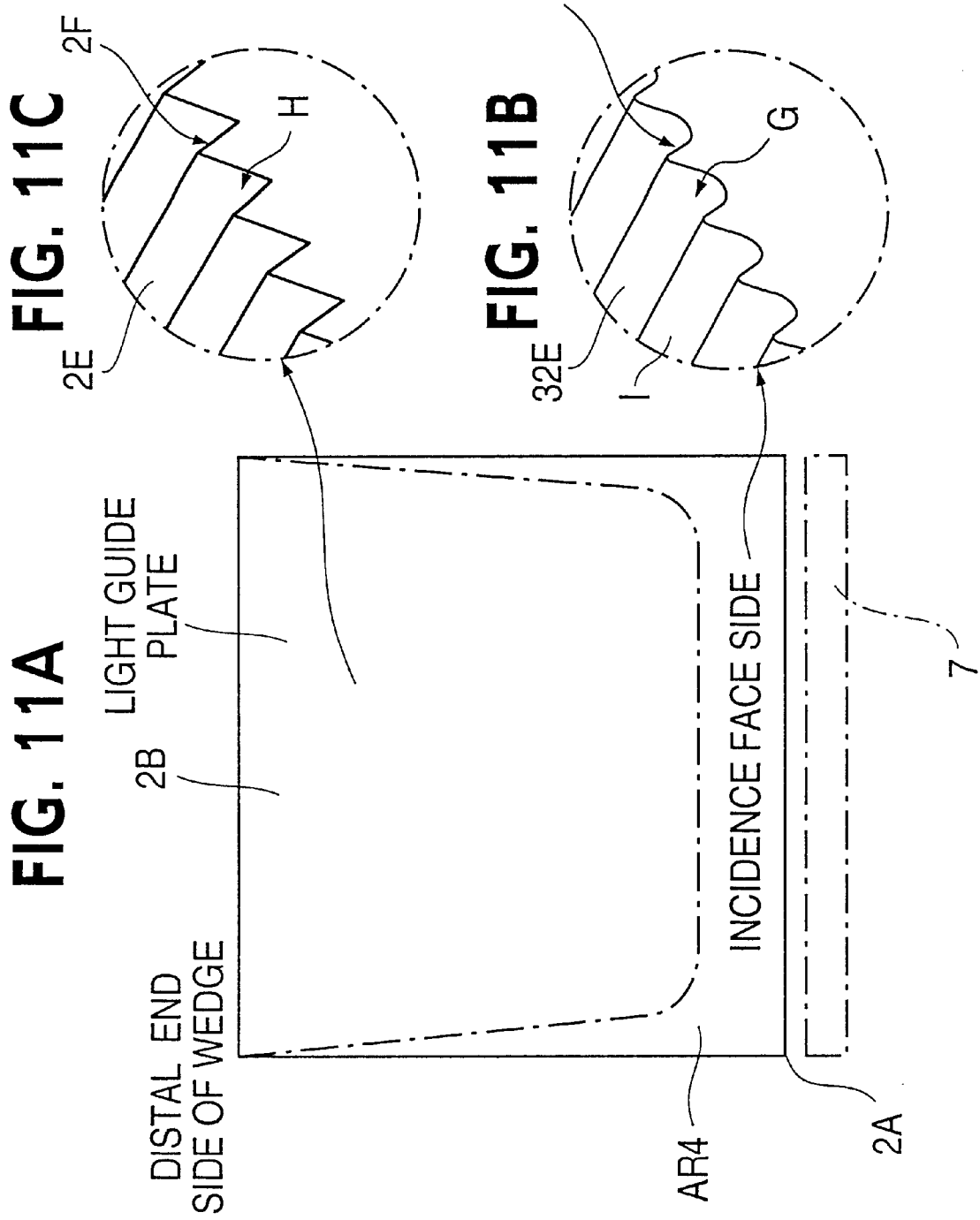
FIG. 11 is a plan view to illustrate a modification of the light guide plate shown in FIG. 9; and, FIG. 12 is a perspective view to illustrate a light guide plate provided with projections for positioning and holding with respect to a frame.

In the case of FIG. 11, after the second embodiment, curled profiles are given to both valleys (slope 12E, 12F) and top portions of projection rows within the area AR4. Considering that reflective appearance tends to emerge decreasingly as distance from the incidence face increases, width of the area AR4 decreases accordingly.

(b) Although description is mainly focuses on cases where a prism cut face is formed on a back face of a light guide plate in the above embodiments, the present invention is not limited by this. That is, the present invention is applicable to cases where a prism cut face is formed on an emission face of a light guide plate.

In this instance, the light guide plate 2 or 32 in the first or second embodiment should be turned over in an arrangement as shown in FIG. 2. That is, if the light guide plate 2 or 32 is turned over, diversifying inner reflections by curled profiles are caused at an emission face, instead of at a back face. Thus, needless to say, reflective appearance is reduced because light which comes via an edge is apportioned to various directions.

Figure 12:
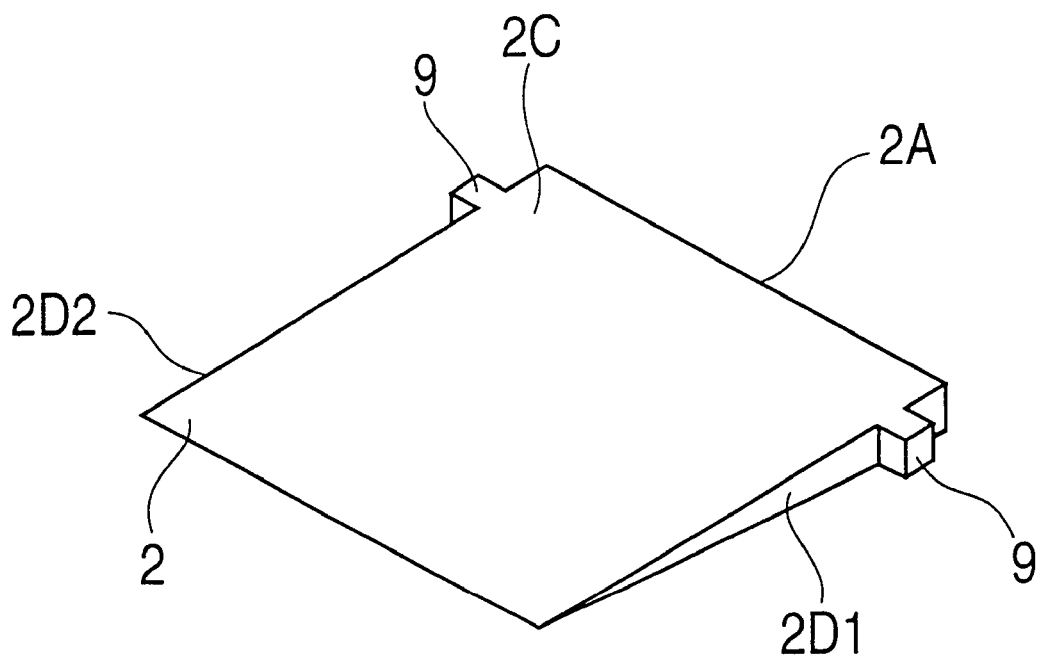

(c) As illustrated in FIG. 12, rectangular-like projections 9 may be formed on flank faces 2D1, 2D2 in the vicinity of an incidence 2A face for positioning and securing with respect to a frame on which members including a guide plate and others are mounted and secured. Needless to say, the present invention is also applicable to such light guide plate 2, surface light source device and liquid crystal display employing it, respectively.

(d) Additional sheets such as prism sheet and protection sheet are exemplarily illustrated and accordingly put no limit on the present invention. The present invention is applicable to cases where an additional sheet of different type is arranged and other cases where no additional sheet is arranged. The present invention is also applicable to cases where a prism cut surface like that of a prism sheet is formed on an emission face or back face of a light guide plate in order to give a function like that of the prism sheet.

(e) A light guide plate made of a material other than transparent resin may be employed. For example, so-called light scattering guiding material provided with scattering power inside is employable. Characteristics, methods of producing and others of light scattering guiding material is known well.

(f) A guide plate with a cross section other than wedge-shaped may be employed. For instance, a guide plate having a uniform thickness is employable.

(g) Two or more side end faces of a light guide plate may provide incidence faces, respectively. A plurality of primary light sources may be arranged accordingly.

(h) A primary light source may be provided with a light source element other than rod-shaped ones like fluorescent lamp. For instance, a plurality of point-like light source elements such as LEDs may be arranged to provide a primary light source.

(i) Surface light source devices in accordance with the present invention may be applied to uses other than back-lighting of liquid crystal display. For instance, they may be applied to frontlighting of liquid crystal display, and broadly applicable to various illumination devices and displays.

What is claimed is:

1. A light guide plate comprising:
   minor faces to provide an incidence face for light input and flank faces adjacent to opposite ends of said incidence face;
   major faces comprising a back face to provide an emission face for light output, one of said major faces being provided with a great number of projection rows running in a direction approximately perpendicular to said incidence face, thereby providing a great number of valleys;
   wherein each of said valleys includes, in a vicinity of said incidence face, a first curled-surface bottom portion comprised of a connected pair of approximately cylindrically surfaced slopes provided by a pair of the projection rows located at opposite sides of each of said valleys.

2. A light guide plate in accordance with claim 1, wherein each of said valleys comprises in vicinities of said flank faces, a second curled-surface bottom portion comprised of a connected pair of approximately cylindrically surfaced slopes provided by a pair of the projection rows, located at opposite sides of each of said valleys.

3. A light guide plate in accordance with claim 2, wherein a roundness of said great number of valleys increases according to a decreasing distance from said flank faces.

4. A light guide plate in accordance with claim 1, wherein a roundness of said great number of valleys increases according to a decreasing distance from said flank faces.

5. A surface light source device comprising:
   a primary light source; and
   a light guide plate, said light guide plate comprising:
      minor faces to provide an incidence face and flank faces adjacent to opposite ends of said incidence face,
      major faces comprising a back face and an emission face,
   wherein said light guide plate is arranged to be supplied with light from said primary light source through said incidence face,
      one of said major faces being provided with a great number of projection rows running in a direction approximately perpendicular to said incidence face, thereby providing a great number of valleys,
      each of said valleys comprising, in a vicinity of said incidence face, a first curled-surface bottom portion comprised of a connected pair of approximately cylindrically surfaced slopes provided by a pair of the projection rows located at opposite sides of each of each of said valleys.

6. A surface light source device in accordance with claim 5, wherein each of said valleys comprises, in vicinities of said flank faces, a second curled-surface bottom portion comprised of a connected pair of approximately cylindrically surfaced slopes provided by a pair of the projection rows, located at opposite sides of said valleys.

7. A surface light source device in accordance with claim 6, wherein a roundness of said great number of valleys increases according to a decreasing distance from said flank faces.

8. A surface light source device in accordance with claim 5, wherein a roundness of said great number of valleys increases according to a decreasing distance from said incidence face.

9. A liquid crystal display including a liquid crystal display panel and a surface light source device, said surface light source device comprising:
   a primary light source; and
   a light guide plate, said light guide plate comprising:
      minor faces to provide an incidence face and flank faces adjacent to opposite ends of said incidence face;
      major fades to provide an emission face and back face,
   wherein said light guide plate is arranged to be supplied with light from said primary light source through said incidence face,
      one of said major faces being provided with a great number of projection rows running in a direction approximately perpendicular to said incidence face, thereby providing a great number of valleys,
      each of said valleys comprising, at least in the vicinity of said incidence face, a curled-surface bottom portion composed of a connected pair of approximately cylindrically surfaced slopes provided by a pair of projection rows located at both sides of each of said valleys.

10. A liquid crystal display in accordance with claim 9, wherein said each valley includes, further in the vicinities of said flank faces, a curled-surface bottom portion composed of a connected pair of approximately cylindrically surfaced slopes provided by a pair of projection rows located at both sides of each of said valleys.

11. A liquid crystal display in accordance with claim 10, wherein a roundness of said great number of valleys increases according to a decreasing distance from said flank faces.

12. A liquid crystal display in accordance with claim 9, wherein a roundness of said great number of valleys increases according to a decreasing distance from said incidence face.

13. A light guide plate comprising:

a first face to receive light;

second and third faces adjacent to opposite ends of the first face;

a fourth face to emit the received light, the fourth face comprising a plurality of projection rows forming a plurality of valleys and running in a direction approximately perpendicular to said first face, each of the valleys comprising a curled-surface bottom portion.

* * * * *